United States Patent
Chen et al.

(10) Patent No.: US 10,550,002 B2
(45) Date of Patent: Feb. 4, 2020

(54) METHOD FOR TREATMENT OF HEXACHLORODISILANE AND HYDROLYZED PRODUCT

(71) Applicant: NATIONAL KAOHSIUNG UNIVERSITY OF SCIENCE AND TECHNOLOGY, Kaohsiung (TW)

(72) Inventors: Jenq-Renn Chen, Kaohsiung (TW); Hsiao-Yun Tsai, Kaohsiung (TW); Yu-Jhen Lin, Kaohsiung (TW); Chien-Ho Liu, Kaohsiung (TW); Mo-Geng Chin, Kaohsiung (TW); Cheng-Chieh Wang, Kaohsiung (TW); Eugene Yin Ngai, Whitehouse Station, NJ (US)

(73) Assignee: National Kaohsiung University of Science and Technology, Kaohsiung (TW)

( * ) Notice: Subject to any disclaimer, the term of this patent is extended or adjusted under 35 U.S.C. 154(b) by 77 days.

(21) Appl. No.: 15/987,229

(22) Filed: May 23, 2018

(65) Prior Publication Data
US 2019/0359490 A1    Nov. 28, 2019

(51) Int. Cl.
C01B 33/107    (2006.01)

(52) U.S. Cl.
CPC .................. *C01B 33/107* (2013.01)

(58) Field of Classification Search
CPC .................. C01B 33/107; C01B 33/10773
See application file for complete search history.

(56) References Cited

U.S. PATENT DOCUMENTS

| 5,651,807 A * | 7/1997 | Gundersen ............ C01B 33/107 75/10.48 |
| 7,976,807 B2 | 7/2011 | Imamura et al. |
| 9,504,959 B2 | 11/2016 | Knies et al. |
| 2012/0070361 A1 * | 3/2012 | Matsuo ................ B01D 53/002 423/342 |
| 2014/0363362 A1 * | 12/2014 | Ishikawa ........... C01B 33/10742 423/341 |

* cited by examiner

*Primary Examiner* — Ngoc-Yen Nguyen
(74) *Attorney, Agent, or Firm* — Rosenberg, Klein & Lee

(57) ABSTRACT

A method for treatment of a hexachlorodisilane and its hydrolyzed product is disclosed. It comprises adding a hexachlorodisilane or its hydrolyzed product into a sulfuric acid solution for reaction.

4 Claims, No Drawings

METHOD FOR TREATMENT OF HEXACHLORODISILANE AND HYDROLYZED PRODUCT

BACKGROUND OF THE INVENTION

1. Field of the Invention

The present invention relates to a method for treatment of a hexachlorodisilane and its hydrolyzed product, especially for a disposal of hexachlorodisilane vapor, liquid and hydrolyzed residues by using sulfuric acid for reaction so as to prevent generation of shock sensitive powders.

2. Description of Related Art

Hexachlorodisilane is a clear liquid that hydrolyzed with water or moisture in air and the resulting products are shock sensitive and can be ignited upon impact or flame to generate explosive reaction. Hexachlorodisilane is used extensively in the manufacturing of advanced semiconductor devices through chemical vapor deposition process. It is necessary to dispose the remaining vapor from such process. In the synthesis and purification processes of hexachlorodisilane, it is also necessary to dispose properly the process exhaust that also contains hexachlorodisilane. Upon accidental release or leak of hexachlorodisilane liquid, hydrolysis with moisture in the air will occur and it is necessary to dispose the hydrolyzed products of hexachlorodisilane.

U.S. Pat. No. 7,976,807 B2 issued on 12 Jul. 2011, disclosed a method for detoxifying HCD gas and apparatus therefor, which describes the treatment of hexachlorodisilane-containing gases. This treatment involves first oxidizing the waste gas with exclusion of moisture in a complex apparatus before it is passed through a scrubber filled with water. Although the method is effective, it requires however a complicated apparatus with precise control of moisture in the oxidizing gas.

U.S. Pat. No. 9,504,959 B2 issued on 29 Nov. 2016, disclosed a process for disposal of hexachlorodisilane-containing vapors, which describes the disposal of hexachlorodisilane and residues without generating pyrophoric compositions by reaction with urea and alcohol in nonpolar solvent. Although the method is effective, the solvent is flammable as well potentially water reactive. Upon contact with water, shock sensitive may still form.

SUMMARY OF THE INVENTION

In view of the above-mentioned problems, the object of the present invention is to provide a method for treatment of a hexachlorodisilane and its hydrolyzed product by using sulfuric acid for reaction so as to prevent generation of shock sensitive powders and thus solve problems of ignition and explosion due to impact or flame in the process of treatment.

Disclosed herein is a method for treatment of a hexachlorodisilane and its hydrolyzed product. It comprises adding a hexachlorodisilane or its hydrolyzed product into a sulfuric acid solution for reaction. The hexachlorodisilane comprises pure hexachlorosilane liquid, pure hexachlorosilane vapor or/and diluted hexachlorosilane vapor. Preferably, the sulfuric acid solution has a concentration ranging from 1 wt % to 98 wt %, more preferably, ranging from 20 wt % to 90 wt %.

DETAILED DESCRIPTION OF THE PREFERRED EMBODIMENT

It has been known that hexachlorodisilane can hydrolyzed rapidly with water or moisture and the hydrolyzed products is shock sensitive and can be ignited upon impact or flame to generate explosive reaction. The major cause of the shock sensitivity is attributed to the intramolecular oxidation from Si—Si and Si—OH bonds. It is thus necessary to provide a method which vapors, liquid or hydrolyzed products of hexachlorodisilane can be safely disposed without generating a shock sensitive or ignitable powder.

Disclosed herein is a method for treatment of a hexachlorodisilane and its hydrolyzed product, comprising adding a hexachlorodisilane or its hydrolyzed product into a sulfuric acid solution for reaction. The hexachlorodisilane comprises pure hexachlorosilane liquid, pure hexachlorosilane vapor or/and diluted hexachlorosilane vapor.

On introduction of hexachlorodisilane or hydrolyzed products into an aqueous sulfuric acid, no shock sensitive or ignitable products are formed. Although the hydrolysis of hexachlorodisilane generated solid residues and hydrochloric acid (HCl), it is found that HCl is not attached on the solid residues as evident by the SEM/EDS analysis of the residue. The hydrolyzed products are also found to be shock sensitive as long as the Si—Cl bonds are depleted in hexachlorodisilane. Even if the hydrolysis reaction is taking placed in liquid water where HCl may dissolve and retain, the hydrolyzed products are still shock sensitive after drying. If however alkaline such as sodium hydroxid (NaOH) is used to neutralize the HCl, the shock sensitivity of the dried hydrolyzed products were found to increase dramatically owing to alkaline attack and weakening of the Si—Si bonds. Therefore, pH is not the dominant factor for shock sensitivity of the hydrolyzed products.

It has surprisingly been found that the simplest way of suppression the shock sensitivity of hydrolyzed products is liquid water in which wet hydrolyzed products with water contents of at least 33 wt % and preferably 50 wt % cannot be ignited by shock or flame. However upon drying with decreasing water contents, shock sensitivity is re-appeared.

An additional means of suppression the shock sensitivity of hydrolyzed products is aqueous sulfuric acid solution in which the hydrolyzed products will suspend in aqueous sulfuric acid solution much like a colloidal. The suspended products may take extended time to dry and even upon drying, it cannot be ignited by impact or flame Infrared spectroscopy examination of the dried products showed that sulfuric acid was bind to hydrolyzed products. It is thus safe to be disposed as a general hazardous waste. Furthermore, it has also been found that direct injection of hexachlorodisilane vapor or liquid into aqueous sulfuric acid solution rapidly formed hydrolyzed products binding to sulfuric acid in a colloidal form. Therefore, aqueous sulfuric acid solution can be used as an abatement means for hexachlorodisilane vapor vent or liquid spill.

According to an embodiment of the present invention, the concentration of aqueous sulfuric acid solution is not limited but is generally 1 wt % to 98 wt %, and preferably 20 wt % to 90 wt %.

Hereinafter, an exemplary embodiment of the present invention will be described in detail.

Example 1

Liquid hexachlorodisilane was hydrolyzed in ambient air with dew point of 25° C. and temperature of 32° C. The hydrolyzed products are white, amorphous powder which can be ignited by a BAM fall-hammer with impact energy of 20 J. Ignition of the powder by a small jet fire produced a large fire. Heat of combustion was measured to be 1060 cal/g by an Oxygen Bomb calorimeter.

The hydrolyzed powder was immersed and mixed in 9.8 wt % sulfuric acid solution. The powder was then filtered and dried in an oven 100° C. for 1 hr. The dried powder was subjected to 50 J of impact in the BAM fall-hammer but no visible flame or spark observed. Ignition of the powder by a small jet fire did not produce visible flame.

Example 2

Nitrogen was bubbled through liquid hexachlorodisilane in a closed vessel and the vapor mixture was directed into a liquid bath containing 20 wt % sulfuric acid solution. After one hour, the solution was filtered and placed in an oven 100° C. After 1 hr, the filtrate remained wet and had an appearance of gel. After additional 3 hrs drying, the powder was subjected to 50 J of impact in the BAM fall-hammer but no visible flame or spark observed. Ignition of the powder by a small jet fire did not produce visible flame.

Comparative Example 1

Nitrogen was bubbled through liquid hexachlorodisilane in a closed vessel and the vapor mixture was directed into a liquid bath containing 10 wt % nitric acid solution. During bubbling, powder plugged the vent line quickly even with ultrasonic oscillator. Upon knocking of the vent line, ignition with visible flame occur inside the bubbling vessel. After one hour, the solution was filtered and placed in an oven 100° C. for 1 hr. The dried powder was subjected to 50 J of impact in the BAM fall-hammer and visible flame observed. Ignition of the powder by a small jet fire also produced large visible flame.

According to the above description, in comparison with the traditional technique, a method for treatment of a hexachlorodisilane and its hydrolyzed product according to the present invention has the advantages as following:

1. The present method using sulfuric acid for treatment of a hexachlorodisilane and its hydrolyzed product prevents generation of shock sensitive powders in the process of treatment and thus solves problems of ignition and explosion due to impact or flame.

2. The present method directly injects hexachlorodisilane vapor or liquid into aqueous sulfuric acid solution to rapidly form hydrolyzed products binding to sulfuric acid in a colloidal form, so the hexachlorodisilane vapor vent or liquid spill can be reduced.

3. The present method uses sulfuric acid solution to make hydrolyzed product of hexachlorodisilane suspend in aqueous sulfuric acid solution much like a colloidal, so the suspended products cannot be ignited by impact or flame even upon drying, which also increases the safety in the process of treatment.

What is claimed is:

1. A method for treatment of a hexachlorodisilane or its hydrolyzed product, comprising adding a hexachlorodisilane or its hydrolyzed product into a sulfuric acid solution for reaction.

2. The method for treatment of a hexachlorodisilane or its hydrolyzed product as claimed in claim 1, wherein the hexachlorodisilane comprises pure hexachlorosilane liquid, pure hexachlorosilane vapor, or diluted hexachlorosilane vapor.

3. The method for treatment of a hexachlorodisilane or its hydrolyzed product as claimed in claim 1, wherein the sulfuric acid solution has a concentration ranging from 1 wt % to 98 wt %.

4. The method for treatment of a hexachlorodisilane or its hydrolyzed product as claimed in claim 3, wherein the sulfuric acid solution has a concentration ranging from 20 wt % to 90 wt %.

* * * * *